United States Patent
Wang (10) Patent No.: US 7,792,900 B2
(45) Date of Patent: Sep. 7, 2010

(54) OVERLAY NETWORK SYSTEM AND SERVICE PROVIDING METHOD

(75) Inventor: Honggang Wang, Kanagawa (JP)

(73) Assignee: Sony Corporation, Tokyo (JP)

( * ) Notice: Subject to any disclaimer, the term of this patent is extended or adjusted under 35 U.S.C. 154(b) by 210 days.

(21) Appl. No.: 12/034,108

(22) Filed: Feb. 20, 2008

(65) Prior Publication Data

US 2008/0275952 A1    Nov. 6, 2008

(30) Foreign Application Priority Data

Feb. 21, 2007    (JP) .......................... P2007-041499

(51) Int. Cl.
    *G06F 15/16* (2006.01)
(52) U.S. Cl. .................. 709/204; 709/203; 709/226; 370/255
(58) Field of Classification Search .......... 709/203, 709/204, 226; 370/255
    See application file for complete search history.

(56) References Cited

U.S. PATENT DOCUMENTS

| 7,421,471 B2 | 9/2008 | Van Datta | |
|---|---|---|---|
| 2005/0204042 A1* | 9/2005 | Banerjee et al. | 709/226 |
| 2007/0033167 A1* | 2/2007 | Basu et al. | 707/3 |
| 2007/0209042 A1* | 9/2007 | Mullan et al. | 719/328 |
| 2007/0291706 A1* | 12/2007 | Miller et al. | 370/338 |
| 2008/0091807 A1* | 4/2008 | Strub et al. | 709/223 |
| 2008/0130516 A1* | 6/2008 | You et al. | 370/254 |

FOREIGN PATENT DOCUMENTS

| JP | 2004-72603 | 3/2004 |
|---|---|---|
| JP | 2005-196676 | 7/2005 |
| JP | 2005-524920 | 8/2005 |

OTHER PUBLICATIONS

Maruyama, Tagashira, Fujita, Information supervision technique with an effective condition in Peer CQ, Information Processing Society of Japan memoir, 2006-OS-103, Information Processing Society of Japan, vol. 2006, No. 86, pp. 1-8 (2006).
Abe, DHT: Distributed hash table—Fundamental technology for Pure Peer-to-Peer systems, Computer software, Japan Software Science Society, vol. 23, No. 1, pp. 1-14 (2006).
Translation—Japanese Office Action.

* cited by examiner

*Primary Examiner*—Hassan Phillips
*Assistant Examiner*—Glenford Madamba
(74) *Attorney, Agent, or Firm*—Finnegan, Henderson, Farabow, Garrett & Dunner, L.L.P.

(57) ABSTRACT

In an overlay network system in which at least one node is mapped in a hash space by distributed hash table techniques, each node having a nods identifier obtained by hashing identification information of the own node, at least one service concerning all the nodes is provided. Each node includes a storage unit and a controller. The storage unit stores a service name and a service body of the service. The controller searches for a current service provider node using a service key obtained by hashing the service name, checks whether the own node is allowed to take over the service if a distance between the node identifier of the own node and the service key is less than a distance between the node identifier of the current service provider node and the service key, and invokes the service body to provide the service if the takeover is permitted.

16 Claims, 8 Drawing Sheets

| INDEX | SERVICE NAME | SERVICE KEY | SERVICE PROFILE NAME | SERVICE PROFILE KEY | SERVICE PROFILE | SERVICE BODY | SERVICE RECORD DATA FILE NAME | SERVICE RECORD DATA FILE KEY | SERVICE RECORD DATA FILE |
|---|---|---|---|---|---|---|---|---|---|
| 1 | urn:abcd:dht:service:global:service:name1 | hash(urn:abcd:dht:service:global:service:name1) | urn:abcd:dht:service:global:service:name1 | hash(urn:abcd:dht:service:global:service:name1) | /dht/service_profile/service_profile.xml | /www/cgi-bin/service1.cgi | urn:abcd:dht:service:global:service:data1 | hash(urn:abcd:dht:service:global:service:data1) | /dht/service_data/service_data1.dat |
| ... | ... | ... | ... | ... | ... | ... | ... | ... | ... |

OVERLAY NETWORK SYSTEM AND SERVICE PROVIDING METHOD

CROSS REFERENCES TO RELATED APPLICATIONS

The present invention contains subject matter related to Japanese Patent Application JP 2007-041499 filed in the Japanese Patent Office on Feb. 21, 2007, the entire contents of which are incorporated herein by reference.

BACKGROUND OF THE INVENTION

1. Field of the Invention

The present invention relates to an overlay network system in which at least one node is assigned in a hash space by distributed hash table techniques, and to a service providing method used in the overlay network system.

2. Description of the Related Art

Recently, as an alternative to client/server systems, an increasing interest is being paid to a form of connection called peer to peer (hereinafter referred to as P2P), in which all the nodes connected to a network can dynamically change their roles. In contrast to a client/server system, in which data is concentrated at a server, in a P2P system, data is saved in peer nodes in a distributed manner. That is, searching for a location where data is saved is performed by cooperation among the peer nodes.

An example of techniques for searching for a location where data is saved is a distributed hash table (hereinafter referred to as DHT). In DHT, information indicating a location where a body of data is saved is registered at a node having a hash value that is approximate to a hash value generated from the data. At this time, the same hash function is used to generate the hash value of the data and the hash value of the node. At each node where information indicating a location where data is saved is registered, pairs of a hash value of the data and the information indicating the location where the body of the data is saved are maintained in the form of a hash table.

Since hash values generated from different data take on entirely different values, nodes at which information indicating locations where data is saved are distributed on the network. That is, hash tables are stored in the peer nodes in a distributed manner, so that the load is distributed among the peer nodes.

When searching for data is performed, the data can be found by calculating a hash value of the data and performing searching using the hash value as a key. In DHT, every node constituting the network has a routing table describing routes to neighboring nodes. In the routing table, the distance between nodes is represented using hash values of the nodes.

In order to refer to data registered at one of the nodes on the network, first, a hash value of the data is calculated, and a searching request is issued to a node having a value that is closest to the hash value of the data with reference to the routing table in the own node. If the node that has received the searching request does not have information indicating a location where the data is saved, the node that has received the searching request issues a searching request to a node having a hash value that is most approximate to the hash value of the data with reference to the routing table in the own node. By repeating this operation, the range of searching becomes narrower, and information indicating the location where the data is saved can be found in the end. When information indicating the location where the data is saved has been obtained, it is possible to obtain the data body on the basis of the information. That is, in an overlay network constructed using DHT techniques, it is possible to access a data body without considering the location of the data body.

As described, above, in DHT, routing is performed on the basis of distances between peer nodes, represented using hash values. Thus, it is not needed to be aware of segments provided on an IP network. That is, it is possible to construct an overlay network using DHT in which routing is performed in a layer above the IP layer.

Services provided on an overlay network can be broadly classified into two types, namely, local services provided by individual nodes and global services relating to the overlay network as a whole. Examples of local services provided by individual nodes include a Web service and an FTP service. The services provided by the individual nodes are available only during periods in which the nodes are alive on the network, and the services become unavailable when the nodes have left the network.

In contrast, even when, for example, a node has newly joined the overlay network or a node has left the overlay network, global services are expected to be available as long as the overlay network exists. Examples of global services include an authentication service that is used when a new node joins the overlay network, and a node list service and a service list service for management.

When global services are provided, some measures are often taken in order to improve the availability of the global services, for example, a server for providing global services is provided on the network, or some nodes are designated in advance as super nodes that act like servers. The scheme in which a server is provided on an overlay network is called hybrid P2P, and the scheme in which super nodes are provided on an overlay network is called super-node hybrid P2P. On the other hand, the scheme in which an overlay network is purely formed of peer nodes alone is called pure P2P.

Japanese Unexamined Patent Application Publication No. 2005-196676 discloses a hybrid P2P system in which a central server is provided in addition to peer nodes.

SUMMARY OF THE INVENTION

In a case where a server or super node is provided on an overlay network so that global services can be provided reliably, the system becomes less flexible compared with a pure P2P system.

Furthermore, in the case of a super-node hybrid P2P, generally, the super nodes are designated on the basis of the abilities of nodes (CPU performance, memory capacity, network bandwidth, etc.). However, for example, in the case of a network formed of terminals used in a video conference system or a network formed of network cameras, the abilities of all the nodes are substantially the same, so that it is difficult to determine which nodes are to be designated as super nodes.

It is desired that global services can be provided autonomously only by peer nodes.

According to an embodiment of the present invention, there is provided an overlay network system in which at least one node is mapped in a hash space by distributed hash table techniques, each of the at least one node having a node identifier obtained by hashing identification information of the own node, and in which at least one service concerning all the nodes constituting the overlay network system is provided. Each of the at least one node includes a storage unit configured to store a service name representing a name of the service and a service body representing a body of the service; and a controller configured to search for a current service provider node using a service key existing in the hash space, the service key being obtained by hashing the service name, to check whether the own node is allowed to take over the service if a distance between the node identifier of the own node and the service key in the hash space is less than a distance between the node identifier of the current service provider node and the service key in the hash space, and to invoke the service body in the own node to provide the service if the takeover is permitted.

Accordingly, each service is automatically assigned to a node having a node identifier that is closest in a hash space to a service key of the service.

According to the embodiment of the present invention, a node that provides a service is automatically designated, so that a global service can be provided autonomously by peer nodes alone.

DESCRIPTION OF THE PREFERRED EMBODIMENTS

Figure 1:
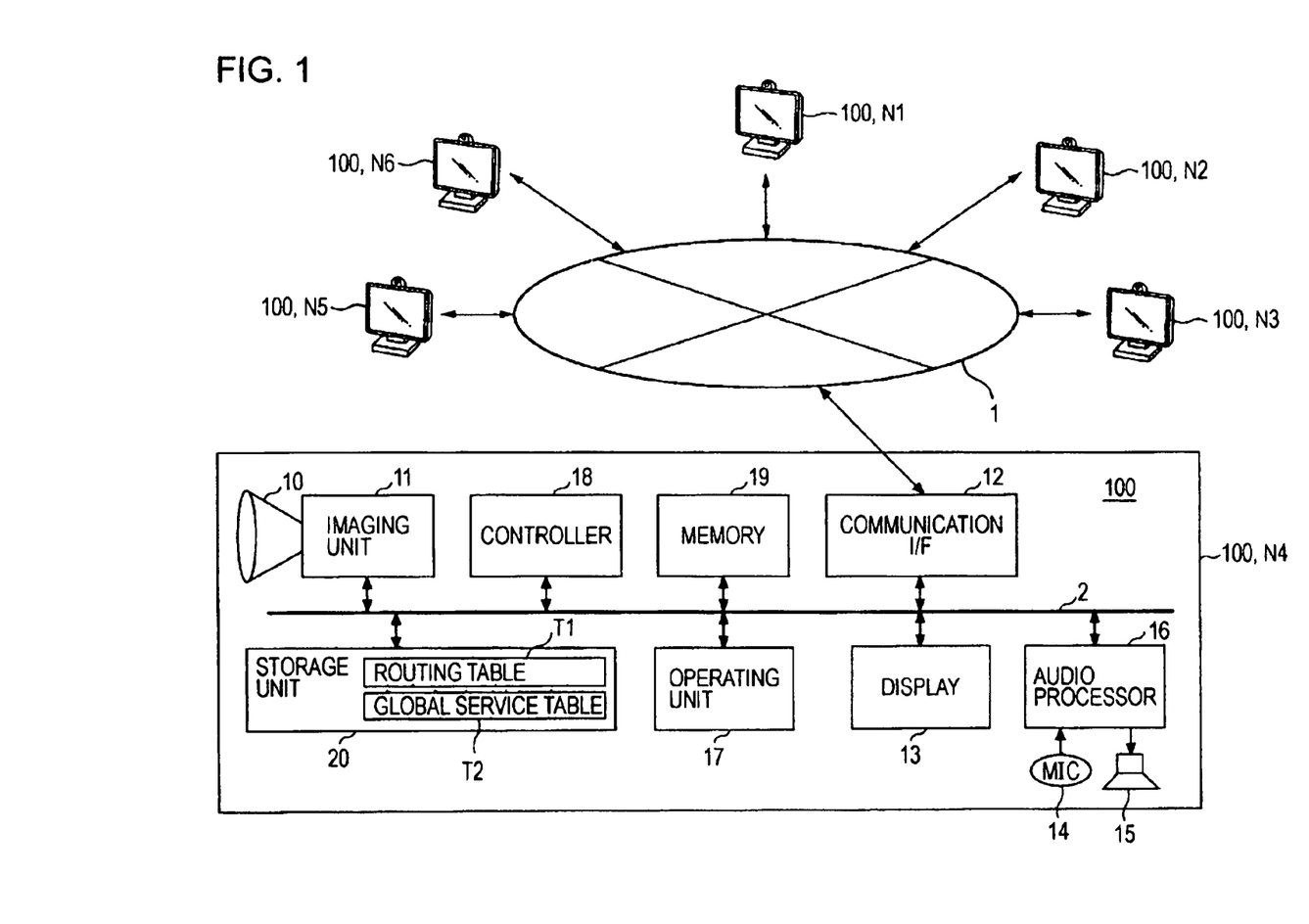
FIG. 1 is a diagram showing an example configuration of a video conference system according to an embodiment of the present invention.

Now, an embodiment of the present invention will be described with reference to the accompanying drawings. In this embodiment, a network system according to the present invention is applied to a video conference system constituted by a plurality of video conference terminals. FIG. 1 is a diagram showing a plurality of video conference terminals 100 connected, to each other via a network 1. Each of the video conference terminals 100 shown in FIG. 1 is a node constituting an overlay network. Thus, in FIG. 1, six video conference terminals 100 connected to the network 1 are denoted individually as nodes N1 to N6. In the following description, when the functions of a video conference terminal 100 as a node are described, the video conference terminal 100 will be denoted as a node Nn (where n is an integer). The embodiment will be described in the context of an example where DHT is used to construct an overlay network and Chord is used as an algorithm therefor.

First, an example of the internal configuration of the video conference terminal 100 will be described. The video conference terminal 100 shown in FIG. 1 includes a lens 10 and an imaging unit 11. The lens 10 is included in a camera unit that is attached externally or provided internally. The imaging unit 11 photoelectrically converts an optical image of an object, input through the lens 10, to generate video signals. The lens 10 and the imaging unit 11 capture an image of a user of the video conference terminal 100, video signals obtained by imaging undergo signal processing in a signal processor (not shown), and the processed video signals are distributed, to the other video conference terminals 100 on the network 1 via a communication interface (hereinafter abbreviated as I/F) 12.

The communication I/F 12 is an interface for connection with the network 1. The communication I/F 12 serves to capture data sent from the other video conference terminals 100 on the network 1 into the video conference terminal 100. The video conference terminal 100 also has a display 13 for displaying images of users of the other video conference terminals 100, obtained via the communication I/F 12. The display 13 is formed of, for example, a liquid crystal panel.

Furthermore, the video conference terminal 100 has a microphone 14 and a speaker 15, and the microphone 14 and the speaker 15 are connected to an audio processor 16. The audio processor 16 executes audio data processing for transmission on audio signals of the user of the video conference terminal 100, collected by the microphone 14, and sends the resulting audio signals to the communication I/F 12. Furthermore, the audio processor 16 executes audio data processing on audio signals of users of the other video conference terminals 100, obtained via the communication I/F 12, and outputs the resulting audio signals from the speaker 15.

The operations of the components described above are executed according to input of user's operations via an operation unit 17 including buttons, a keyboard, and so forth. The operations of the components are controlled by a controller 18 formed of a central processing unit (CPU) or the like. The controller 18 is connected to a memory 19. The memory 19 stores programs need for control, and so forth. The controller 18 reads the programs stored in the memory 19 and executes the programs.

The video conference terminal 100 includes a storage unit 20 formed of a memory card, hard disk, or the like. The storage unit 20 can store data sent from the other users on the network 1, and so forth. Furthermore, the storage unit 20 has stored in advance a routing table T1 and a global service table T2.

The routing table T1 is a table describing location information of nodes neighboring the own node, and is composed of, for example, m rows. On the i-th row of the m-row table, information of nodes within a range of the own node ID+2^(i−1) is described. When m=4, each node stores in its routing table T1 node information of nodes that are 1, 2, 4, and 8 hops from the own node. The node ID is a hash value obtained by an expression hash(X), where an IP address, identifier, or the like of the node is assigned to "X" in the expression. That is, the node ID (identifier) is a hash value obtained by hashing an IP address, identifier, or the like of the node.

Since each node has such a routing table T1, even if each node has only information of nodes that are 1, 2, 4, and 8 hops from the own node, by transferring a searching request from node to node on the basis of information of the routing tables T1 of the individual nodes, the searching range is narrowed, and intended data can be found in the end.

The global service table T2 is a table describing information regarding all global services (hereinafter also simply referred to as services) provided on the overlay network. Examples of global services include an authentication service for the video conference terminals 100, an address list service that allows viewing a list of the video conference terminals 100, and so forth. The global service table T2 will be described later in detail.

In this embodiment, a service is defined as having the following four elements:
- Service name
- Service body
- Service profile
- Service record data file The service name is a name of a service provided on the overlay network, and is represented according to a predetermined naming scheme, for example, in the form of a URI (Uniform Resource Identifier). For example, the authentication service is represented as urn:abcdabcd:dht:product:service:global:authentication, and the address list service is represented as urn:abcdabcd:dht:product:service:global:nodelist. The service body is an executable program, and the program is configured so that the service can be dynamically started or stopped.

The service profile is content in a file format, in which endpoint information (e.g., IP address or URL) or API (Application Programming Interface) for accessing the service is described. The service profile is a file that can be automatically configured according to the own environment of each node, and the content thereof varies among individual nodes. For example, if the format of the service profile is Service-EndPoint=http:host:port:/path/service, the service profile for the same service varies among individual nodes, for example, http://192.168.0.1/cgi-bin/service1.cgi in the node N1 and http://192.168.1.1:8080/service/service1.cgi in the node N2. The service profile and the service body are stored in the storage unit 20 (refer to FIG. 1) of each node.

The service record data file is a file in which data that occurs when a service is executed and that is to be recorded and saved is described. The service record data file is dynamically exported or imported by the service body.

Furthermore, in this embodiment, names for identification are assigned to the individual defined elements, and the elements are mapped in the same hash space of the overlay network using hash values of the assigned names. Thus, services defined by the elements can be searched for and obtained anywhere on the overlay network.

The global service table T2 is a list of names for identification and hash values. Every node in the overlay network has the global service table T2. The global service table T2 includes a number of sets of definitions of elements corresponding to the number of services, so that the elements are defined for all the services provided on the overlay network. If an authentication service and an address list service are provided on the overlay network, the elements described above are defined for each of the authentication service and the address list service.

Figure 2:
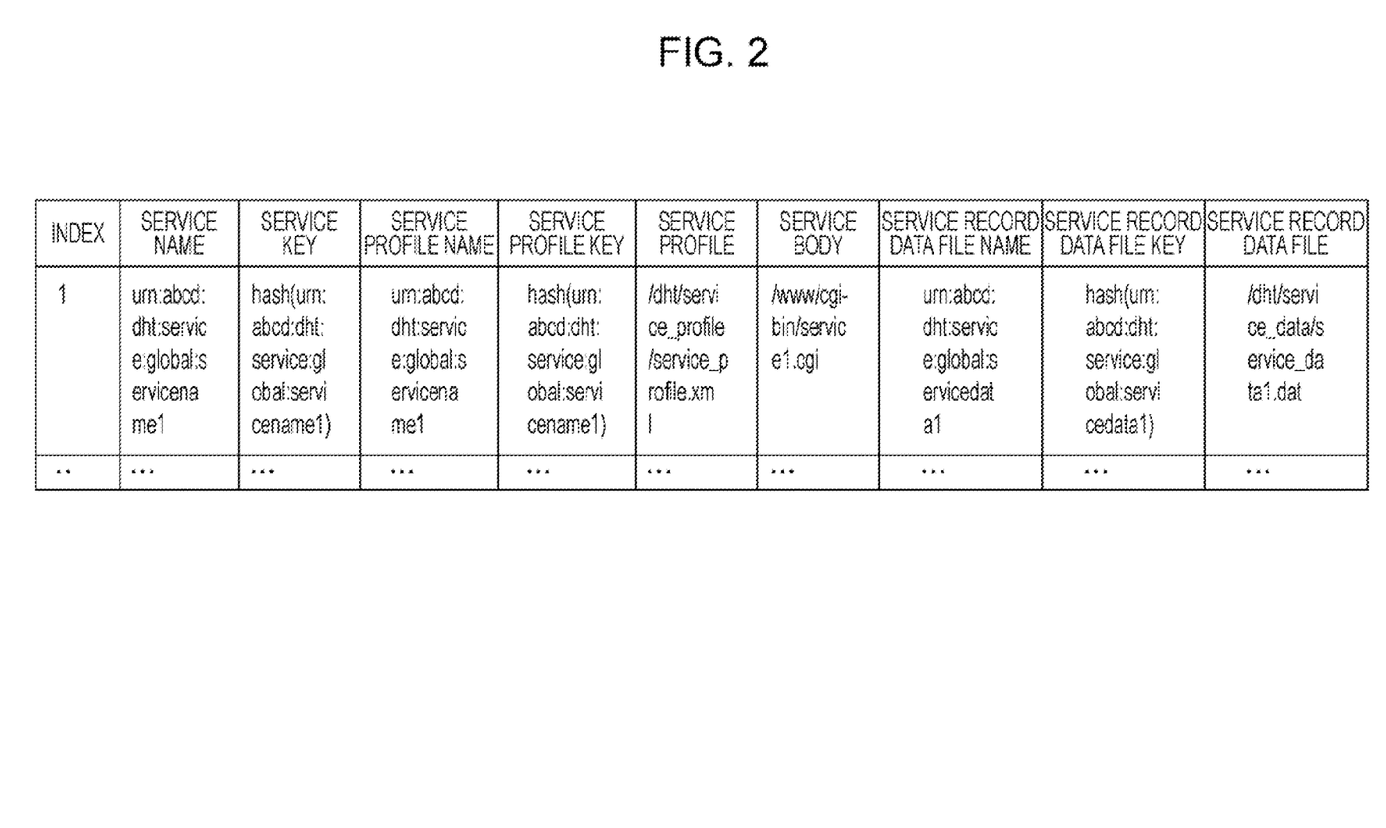
FIG. 2 is a diagram showing an example structure of a global service table in the embodiment.

FIG. 2 shows an example of the structure of the global service table T2. The global service table T2 is composed of fields for index, service name, service key, service profile name, service profile key, service profile, service body, service record data file name, service record data file key, and service record data file.

The index is assigned, in accordance with the number of items counted in the row direction of the global service table T2, and is represented by 1 to n. The number of items counted in the row direction of the global service table T2 increases or decreases in accordance with the number of global services. The service name has been described earlier, so that description thereof will be omitted. The service key is a hash value obtained by hashing the service name, i.e., obtained by hash (service name). In FIG. 2, the service name is "urn:abcd:dht:service:global:servicename1", so that the service key is obtained by "hash(urn:abcd:dht:service:global:servicename1)".

The service profile name is defined to be the same as the service name. The service profile key is a hash value obtained by hashing the service profile name. Since the service profile name is the same as the service name, the service profile key has the same value as the service key.

The service profile describes a path to the body of the service profile described above. Since the service profile is stored in the storage unit 20 (refer to FIG. 1), a path in the storage unit 20 is described. In the example shown in FIG. 2, the path is described as "/dht/service_profile/service_profile1.xml". The path to the service body described above is also described in the service body. In the example shown in FIG. 2, the path is described as "www/cgi-bin/service1.cgi".

The service record data file name is a name of the service record data file. Similarly to the service name, the service record data file name is represented by a character string, such as a URI. In the example shown in FIG. 2, the service record data file name is described as "urn:abcd:dht:service:global:servicedata1". The service record data file key is a hash value obtained by hashing the service record data file name, so that the service record data file key is hash(urn:abcd:dht:service:global:servicedata1). In the service record data file, a path to the body of the service record data file is described.

Since the service key, the service profile key, and the service record data file key can be calculated from the service name, the service profile name, and the service record data file name, the service key, the service profile key, and the service record data file key may be calculated each time instead of including these items in advance in the global service table T2.

Although every node has the same global service table T2, each service is provided only by a specific node. The specific node refers to a node having a node ID with a smallest distance from the service key. In this embodiment, the specific node serves as a service provider. The service provider satisfies the following conditions:
- The service provider has a service body and is executing the service body.
- The service provider provides a service profile.
- The service provider prepares and updates data of a service record data file and uploads latest data onto the overlay network.

That is, although every node on the overlay network has a service body, only a node acting as a service provider executes the service body. Thus, only the service profile owned by the service provider is effective as a service profile describing a method of access to the service that is being executed.

Figure 3:
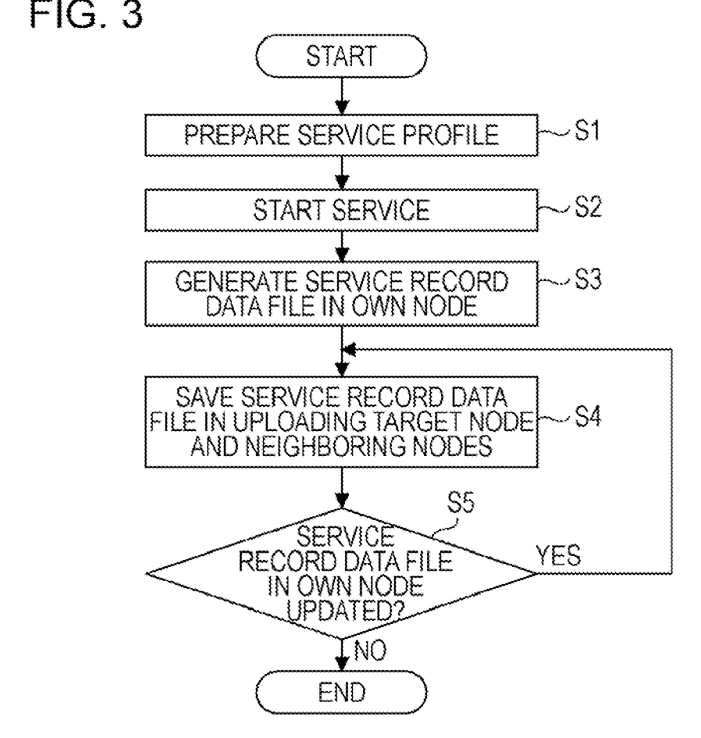
FIG. 3 is a flowchart showing an example of a process that is executed by a service provider node in the embodiment.

FIG. 3 is a flowchart showing an example of a service providing process executed by a node designated as a service provider. The designation of a service provider will be described later. The node designated as the service provider prepares a service profile within the own node (step S1), and invokes the service body (program) stored in the storage unit 20 to start providing the service (step S2). Then, the node generates a service record data file within the own node (step S3). After generating the service record data file, the node determines a target node for uploading the service record data file and nodes neighboring the target node, and saves the service record data file in these nodes (step S4).

The determination of the uploading target node and the saving of the file in the target node in step S4 are executed using an expression put(key, content). That is, by executing the expression put(service record data file key, service record data file), a node that is mapped to the service record data file key (and its neighboring nodes) is determined, and the service record data file (a copy or a fragment that allows restoration of the file) is saved.

After saving the service record data file, the node checks whether the service record data file in the own node has been updated (step S5). If the service record data file has not been updated, no processing is executed. If the service record data file has been updated, the process returns to step S4, in which the updated file is saved in the updating target node. The processing for saving the service record data file in the own node to the updating target node is executed each time the service record data file in the own node is updated.

The service name and the service record data file name are defined to be different names. Since hash values generated from different names (data) have different values, by executing the process described above, the node of the service provider and the nodes in which the service record data file is saved are distributed on the overlay network. In the following description, the process shown in FIG. 3 will be described as a "service providing flow".

Figure 4:
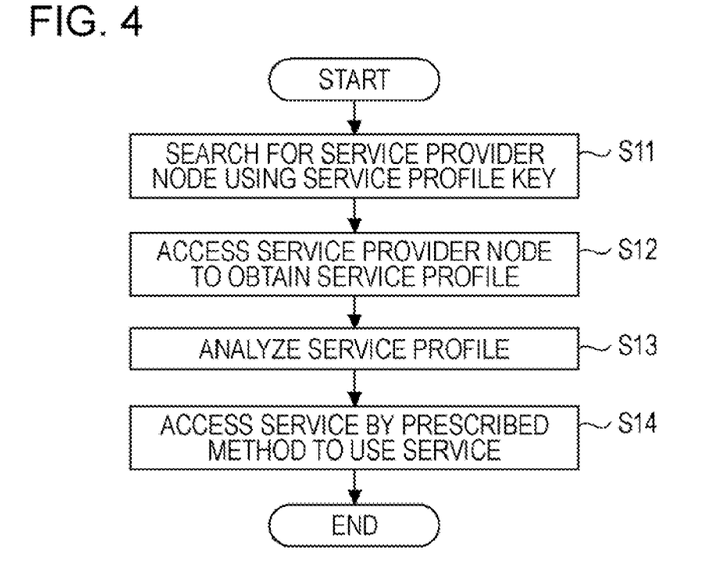
FIG. 4 is a flowchart showing an example of a process that is executed by a service user in the embodiment.

Next, an example of a process executed by a node that uses a service will be described with reference to a flowchart shown in FIG. 4. A node that wishes to use a service first searches for a service provider node using a service profile key in the global service table T2 of the own node (step S11). The searching for a service provider node is executed using an expression Node=lookup(key). A node mapped to the service profile key can be found by assigning the service profile key as "key" in the expression.

After determining the service provider node, the node accesses the service provider node on the basis of the routing table T1 of the own node, and obtains a service profile owned by the service provider node (step S12). Then, the node analyzes the service profile (step S13), and accesses the service by a method described in the service profile to use the service (step S14). In the following description, the process shown in FIG. 4 will be referred to as a "service using flow".

Figure 5:
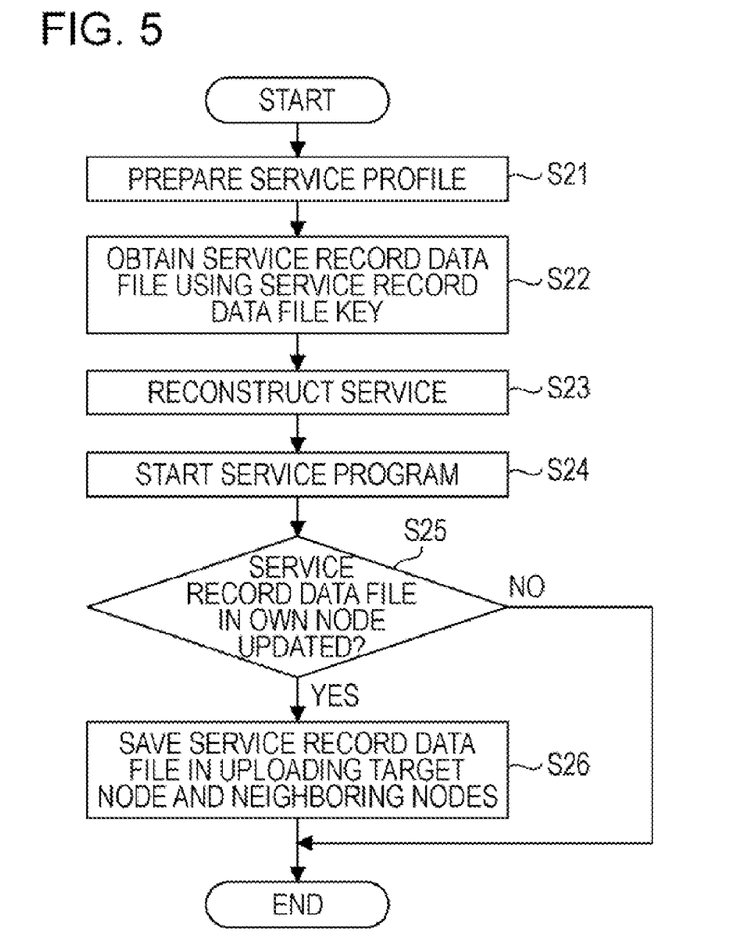
FIG. 5 is a flowchart showing an example of a process that is executed at the time of service takeover in the embodiment.

Next, an example of a process executed by a node that fakes over a service from another node will be described with reference to a flowchart shown in FIG. 5. A node that has newly become a service provider first prepares a service profile (step S21). Then, the node obtains a service record data file from the overlay network using a service record data file key in the global service table T2 (step S22), and reconstructs the service (step S23). The service record data file is obtained using an expression content=get(key). By assigning the service record data file key in "key" in the expression, the service record data file can be obtained from a node mapped to the service record data file key.

After obtaining the service record data file, the node starts the service body (program) (step S24). While the service is being provided, the node checks whether the service record data file in the own node has been updated (step S25). If the service record data file has not been updated, no processing is executed. If the service record data file has been updated, the updated file is saved in the updating target node (step S26). The processing for saving the service record data file in the own node to the updating target node is executed each time the service record data file in the own node is updated. In the following description, the process shown in FIG. 5 will be referred to as a "service takeover flow".

Figure 6:
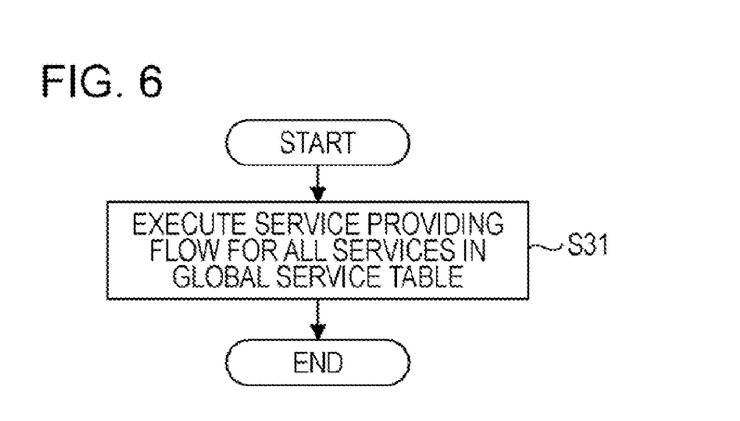
FIG. 6 is a flowchart showing an example of a process that is executed when a node joins an overlay network in the embodiment.

Next, examples of processes that are executed when a new node joins the overlay network will be described with reference to flowcharts shown in FIGS. 6 and 7. FIG. 6 shows an example where a newly joining node is the first node that constitutes an overlay network. The first node joining the overlay network executes the service providing flow (step S31) for every service described in the global service table 72 of the own node. That is, this node acts as a service provider for all the services described in the global service table T2.

Figure 7:
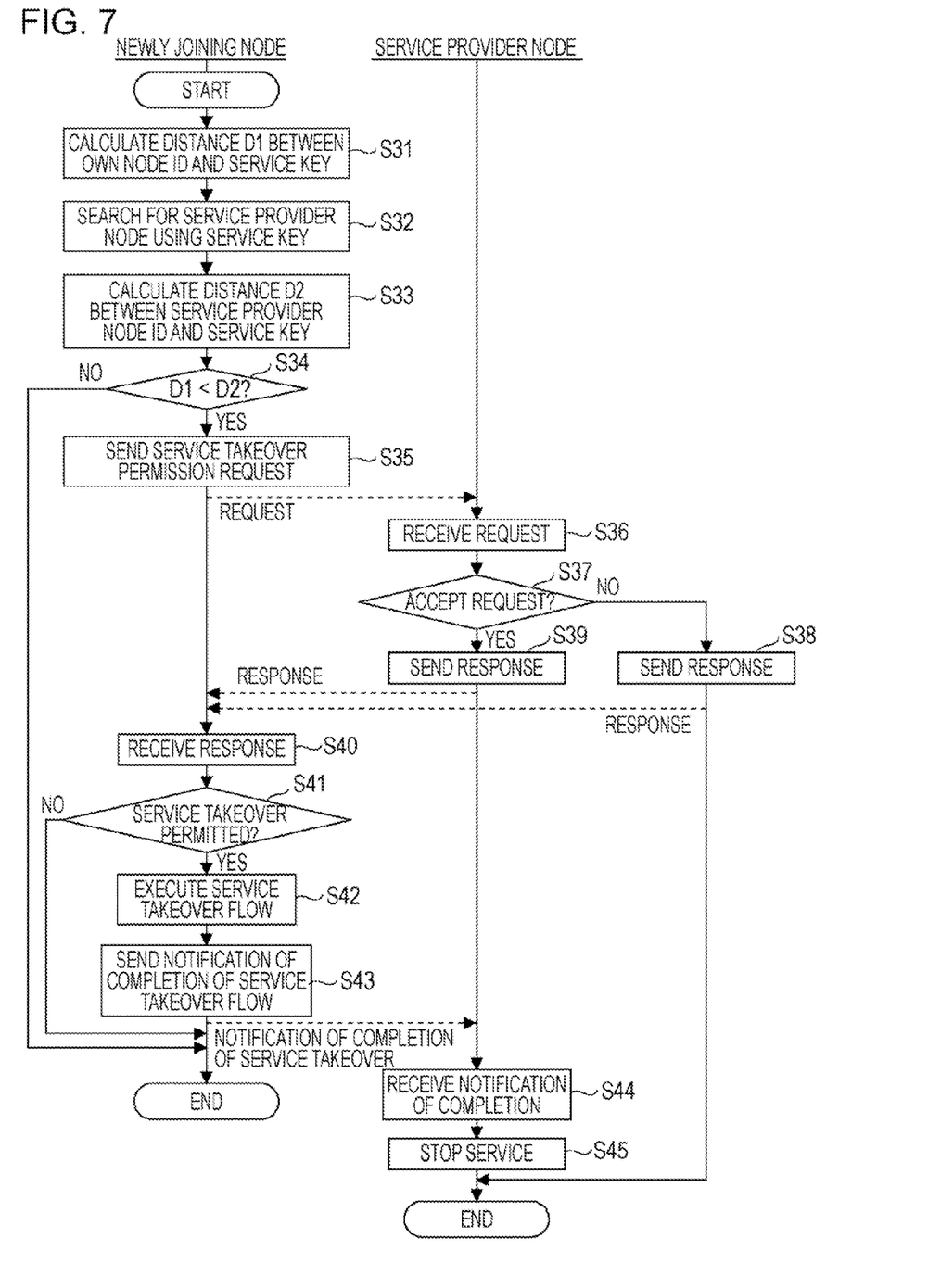
FIG. 7 is a flowchart showing an example of a process that is executed when a node joins an overlay network in the embodiment.

FIG. 7 shows an example of a process that is executed when a new node joys loins an overlay network in which some services are already being provided. The newly joining node calculates a distance D1 between the own node ID and the service key of each service described in the global service table T2 (step S31). Then, the node searches for a service provider node of each service using the corresponding service key (step S32). After searching for the service provider node for each service, the node calculates a distance D2 between the node ID of the service provider node and the relevant service key in the global service table (step S33).

Then, the distance D1 is compared with the distance 02 (step S34). If the distance D1 is greater than or equal to the distance D2 (D1≧D2), the own node has a greater or the same distance to the service key than the current service provider, so that the newly joining node does not take over the service and immediately exits the process. If the distance D1 is less than the distance D2 (D1<D2), the own node has a smaller distance to the service key than the existing service provider node. Thus, in order to become a service provider, the node sends a service takeover permission request to the current service provider node (step S35).

Upon receiving the service takeover permission request (step S36), the current service provider node determines whether or not to accept the request (step S37). If the request is to be rejected, the current service provider node sends a response to the newly joining node at the source of the request together with a reason for rejection (step S38). If the request is to be accepted, the current service provider node sends a response to the newly joining node at the source of the request (step S39).

Upon receiving the response from the current service provider node (step S40), on the basis of the content of the response, the newly joining node determines whether the takeover of the service has been permitted (step S41). If the takeover of the service has been rejected, the newly joining node exits the process immediately. If the takeover of the service has been permitted, the newly joining node executes the service takeover flow (step S42), and sends a notification of completion to the predecessor service provider node after completion of execution of the service takeover flow (step S43). Upon receiving the notification of completion (step S44), the predecessor service provider node stops the service being provided (step S45).

Through the process described above, a node having a smallest distance from the service key constantly serves as a service provider of the service.

Figure 8:
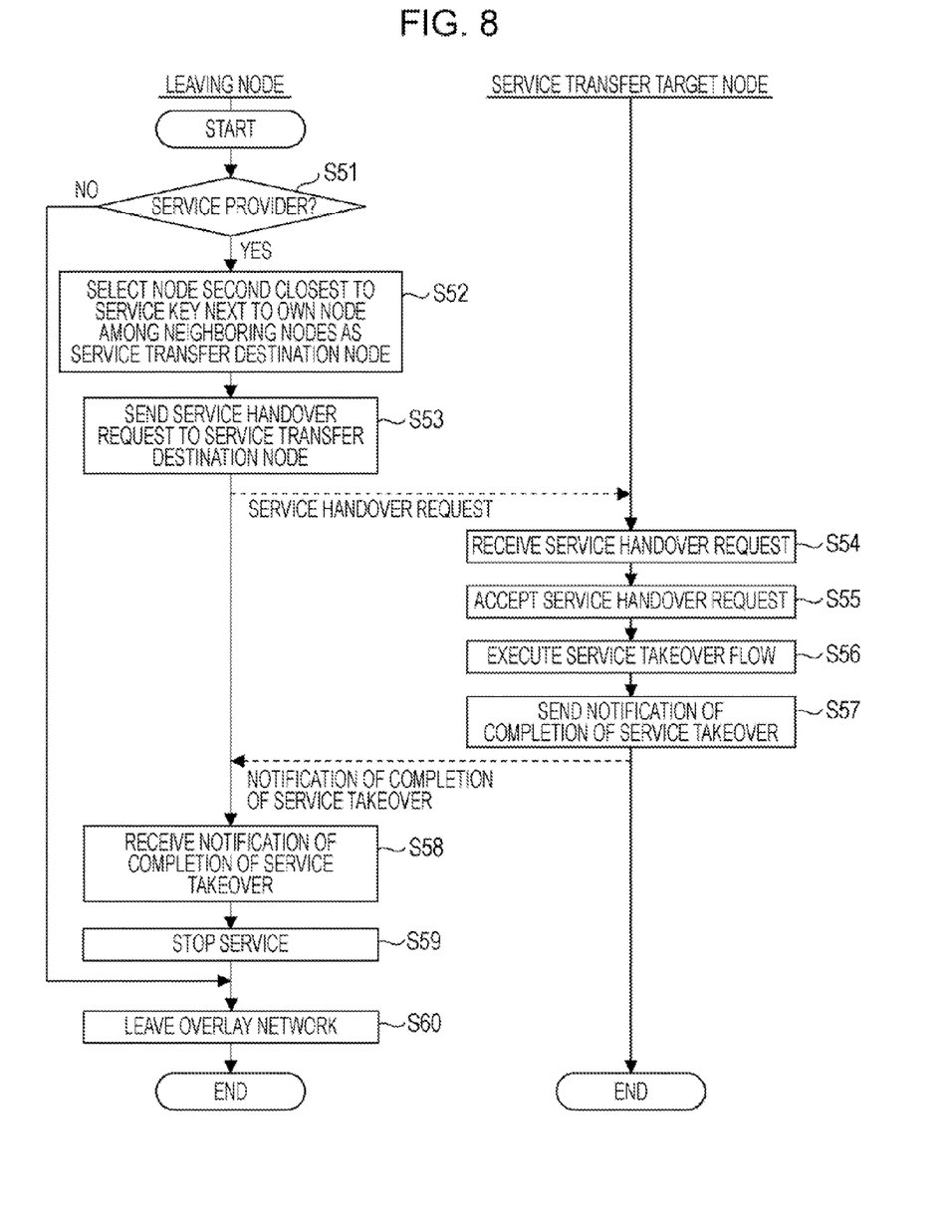
FIG. 8 is a flowchart showing an example of a process that is executed when a node leaves the overlay network normally in the embodiment.
Figure 9:
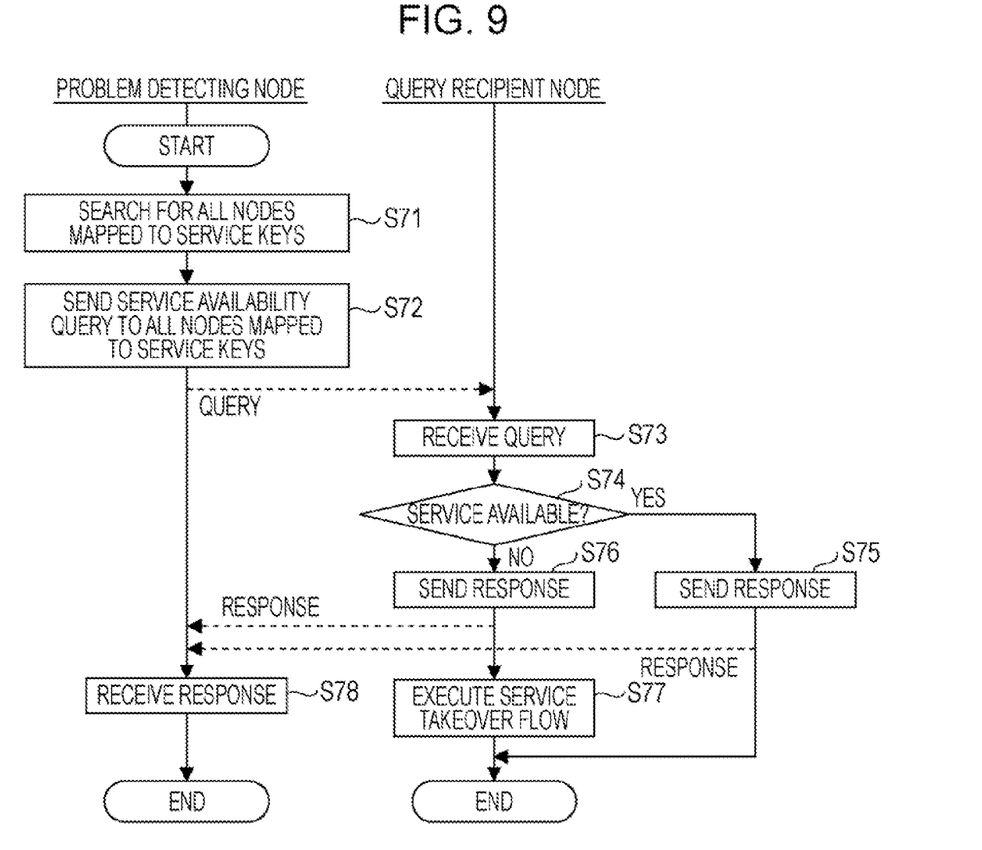
FIG. 9 is a flowchart showing an example of a process that is executed when a problem occurs at a node.

Next, examples of processes that are executed when a node leaves the overlay network will be described with reference to flowcharts shown in FIGS. 8 and 9. FIG. 8 shows an example of a process in which a node normally leaves an overlay network. FIG. 9 shows an example of a process in which a node abruptly leaves the overlay network due to a problem or the like. Referring to FIG. 8, a node that is going to leave the overlay network first determines whether the own node is a service provider (step S51). If the own node is not a service provider, the node immediately leaves the overlay network (step S60).

If the leaving node is a service provider, the leaving node selects, as a service transfer target node, a node having a second smallest distance from the service key next to the own node with reference to the routing table T1 in the own node (step S52). Then, the leaving node sends a service handover request to the service transfer target node (step S53).

Upon receiving the service handover request from the leaving node (step S54), the service transfer target node unconditionally accepts the service handover request (step S55), and executes the service takeover flow (step S56). Upon completion of the service takeover flow, the service transfer target node sends a notification of completion of service takeover to the leaving node (step S57). Upon receiving the notification of service takeover from the service transfer target node (step S58), the leaving node stops the service that is being executed (step S59), and leaves the overlay network (step S60).

Next, an example of a process that is executed when a node abruptly leaves the overlay network due to a problem or the like will be described with reference to a flowchart shown in FIG. 9. Each node constituting the overlay network sends ping or keep alive signals periodically to adjacent nodes, so that if a certain node abruptly leaves the overlay network, adjacent nodes can detect the situation. Thus, if a problem occurs at a certain node, the node that takes an action first is an adjacent node that has detected the problem.

The node that has detected the problem at the adjacent node searches for nodes mapped to service keys using all the service keys in the global service table T2 of the own node (step S71). Then, the node sends a query as to the availability of a service (whether a service is being executed) to all the nodes mapped to the service keys (step S72).

Each of the nodes that have received the query, upon receiving the query (step S73), determines whether a service is being executed at the own node (step S74). If a service is being executed, the node sends a response indicating that a service is being executed to the node that has detected the problem (step S75), and then exits the process. If a service is not being executed, the node sends a response indicating that a service is not being executed to the node that has detected the problem (step S76), and executes the service takeover flow (step S77). Upon receiving the response from the node that has received the query (step S78), the node that has detected the problem immediately exits the process.

Next, a specific example of dynamic service assignment that is executed when a node joins or leaves the overlay network as described above will foe described with reference to FIGS. 10A to 10F. FIGS. 10A to 10F show states where nodes are arranged in a hash space. Since this embodiment is being described in the context of an example where the Chord algorithm is used, the hash space is represented as a circle, and nodes are arranged so that the node IDs become greater in the clockwise direction.

In the Chord algorithm, nodes are mapped in a hash space using a function next(k). This function defines that, regarding a key k, a node that is encountered first in the clockwise direction has a smallest distance from the key k. In FIGS. 10A to 10F, it is assumed that a service S1 is being provided on the overlay network and that the service S1 has a service key 4.

Figure 10A:
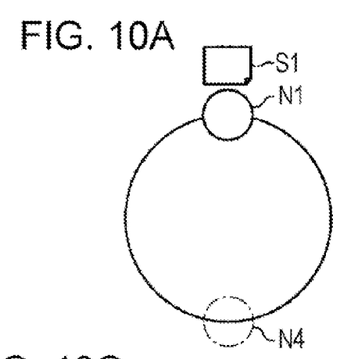
FIG. 10 is a diagram showing an example of a process for dynamic service assignment in the embodiment.

FIG. 10A shows a state where the first node has joined the overlay network. Referring to FIG. 10A, the node that has joined the overlay network first is a node N1, and the node N2 acts as a service provider of the service S1. At this time, actually, the flow described with reference to FIG. 6 is executed. In FIG. 10A, a node N4 is indicated by a broken line. This indicates that if the node N4 exists at this location, next(4)=node N4, indicating that the ID of the node N4 is closest to the service key 4 of the service S1. That is, if the node N4 exists, the service S1 is provided by the node N4.

Figure 10B:
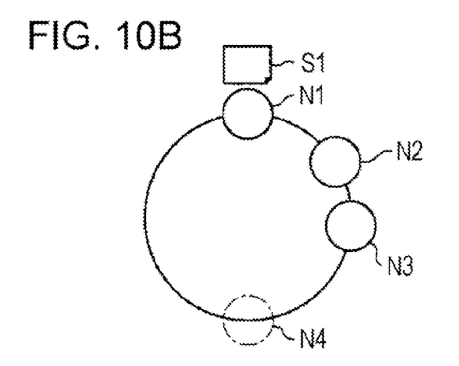

FIG. 10B shows a state where in addition to the node N1, nodes N2 and N3 have newly joined the overlay network. Even when the nodes N2 and N3 have newly joined the overlay network, next(4) is still the node N1 and the node N1 is still closest to the service key, so that takeover of the service S1 does not occur.

Figure 10C:
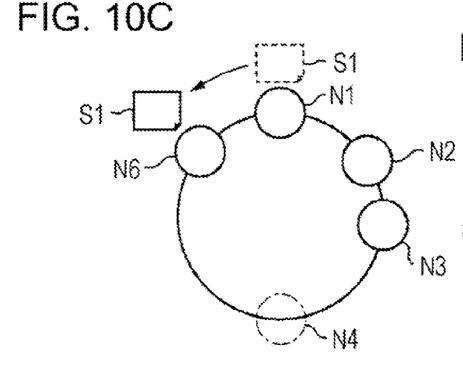

FIG. 10C shows a state where a node N6 has newly joined the overlay network. When the node N6 has joined the overlay network, the node N6 is closest to the service key 4. Thus, takeover of the service S1 from the node N1 to the node N6 occurs. In this case, the process shown in FIG. 7 is executed.

Figure 10D:
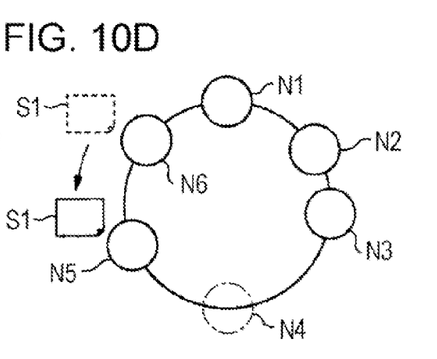
Figure 10E:
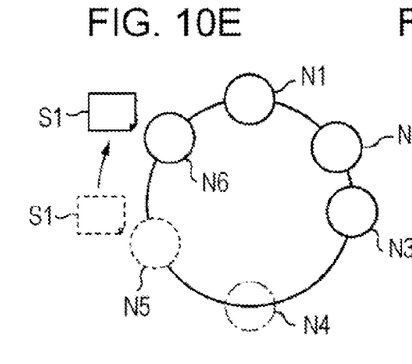

FIG. 10D shows a state where a node NS has newly joined the overlay network, so that next(4)=node N5. In this case, takeover of the service S1 from the node N6 to the node N5 occurs. FIG. 10E shows a state where the node N5 has normally left, the overlay network. That is, the process shown in FIG. 8 is executed. Thus, the service S1, which has been provided by the node N5, is taken over by the node N6, which is second closest to the service key 4 next to the node N5.

Figure 10F:
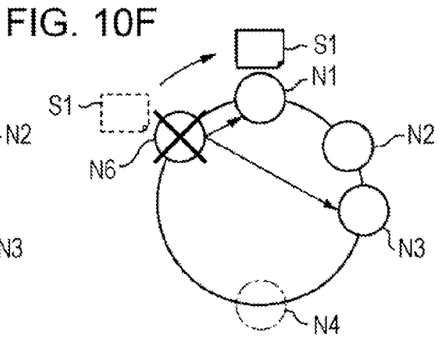

As shown in FIG. 10F, if the node N6 abruptly leaves the overlay network due to a problem or the like, the node N1 and the node N3 detect the situation and become problem detection nodes, and the process described with reference to FIG. 9 is executed. The node mapped to the service key in step S72 shown in FIG. 9 is the node N1 in the case shown in FIG. 10F, so that the node N1 executes the service takeover flow (step S77 shown in FIG. 9), whereby the service S1 is handed over to the node N1.

As described above, a name for identification (service name) is assigned to each service provided on an overlay network, and a node mapped to a hash value obtained by hashing the service name acts as a service provider, so that services are dynamically assigned to nodes.

Furthermore, different names are assigned as a service name and a service record data file name, and the service name and the service record data file name are assigned on the overlay network using a service key obtained by hashing the service name and a service record data file key obtained by hashing the service record data file name. Thus, a service provider mapped to the service key and a node mapped to the service record data file key are distributed on the network.

That is, the service record data file is recorded at a node that is different from the service provider node. Thus, eve if the service provider is changed, for example, due to a service provider node leaving the overlay network, a node that has taken over the service can immediately resume the service using the service record data file stored on the overlay network. That is, a global service can be provided stably without discontinuity in the overlay network.

Furthermore, since every node constituting the overlay network has a service body, even when a node has taken over a service from a predecessor service provider node, the node can start the service immediately without transferring the service body.

Furthermore, even when a problem or the like occurs at a service provider node so that the service provider node becomes unable to provide the service, an adjacent node that has detected the problem searches for a node mapped to the service key using the service key, and causes the node to execute a service takeover process. Thus, interruption of a global service provided on the overlay network is prevented.

As described above, since the overlay network is configured so that a global service can be provided only by peer nodes without interruption, it is not necessary to provide a server or a super node. This serves to construct a flexible system.

Furthermore, since services are assigned to nodes on the basis of service keys obtained by hashing service names of the services, services are assigned fairly and equally to all the nodes constituting the overlay network. Thus, concentration of load to a specific node is prevented.

The embodiment has been described in the context of an example where Chord is used as a DHT algorithm, without limitation to the example, the present invention can be applied to systems in which other algorithms are used, such as CAN or Pastry.

Furthermore, although the embodiment has been described in the context of an example of application to a video conference system, the present invention can also applied to systems in which terminals constituting a network have substantially the same capabilities, for example, a monitoring system constituted by network cameras. When the present invention is applied to the monitoring system, it is possible to provide, for example, a terminal authentication service, a terminal-list obtaining service, or an event-information obtaining service.

It should be understood by those skilled in the art that various modifications, combinations, sub-combinations and alterations may occur depending on design requirements and other factors insofar as they are within the scope of the appended claims or the equivalents thereof.

What is claimed is:

1. An overlay network system in which at least one node is mapped in a hash space by distributed hash table techniques, each of the at least one node having a node identifier obtained by hashing identification information of the own node, and in which at least one service concerning all the nodes constituting the overlay network system is provided, the service having a service key existing in the hash space, the service key being obtained by hashing a service name representing a name of the service, each of the at least one node comprising:
    a storage unit configured to store a service name representing a name of the service and a service body representing a body of the service; and
    a controller configured to search for a current service provider node using the service key existing in the hash space, to check whether the own node is allowed to take over the service if a distance between the node identifier of the own node and the service key in the hash space is less than a distance between the node identifier of the current service provider node and the service key in the hash space, to cause the own node to act as the service provider of the service by executing the service body stored in the storage unit in the own node if the takeover is permitted, and to stop the service in the own node upon receiving a notification of completion of service takeover from another node, when the another node is permitted to take over the service from the own node.

2. The overlay network system according to claim 1,
    wherein the storage unit of the node stores a service record data file and a service record data file name, the service record data file being data used for execution of the service, and the service record data file name being a name of the service record data file, and
    wherein when the own node starts providing the service, the controller of the node searches for a node mapped to a service record data file key using the service record data file key, the service record data file key being obtained by hashing the service record data file name, and transfers a copy of the service record data file to the node found by the searching.

3. The overlay network system according to claim 1,
    wherein the storage unit of the node stores a service profile and a service profile name, the service profile describing a method of access to the service body, and the service profile name being a name of the service profile, and
    wherein the controller of the node provides the service profile when the controller starts the service.

4. The overlay network system according to claim 3,
    wherein when the controller of the node uses the service, the controller searches for a node mapped to the service key using the service key, and obtains the service profile from the node found by the searching and accesses the service body.

5. The overlay network system according to claim 1,
    wherein when the own node is providing the service and the own node leaves the overlay network, the controller of the node searches for a node for which a distance between the node identifier and the service key in the hash space is second smallest next to the own node among nodes neighboring the own node, and sends a service handover request to the node found by the searching.

6. The overlay network according to claim 5,
    wherein upon receiving the service handover request sent from another node, the controller of the node searches for a node in which the service record data file is stored using the service record data file key, obtains the service record data file from the node found by the searching, and invokes the service body to start providing the service.

7. The overlay network system according to claim 2,
    wherein, upon detecting a problem at a neighboring node, the controller of the node searches for nodes mapped to service keys using all the service keys obtained by hashing the service names of all the services, and sends a confirmation request to the nodes found by the searching as to whether the nodes are providing the services.

8. The overlay network system according to claim 7,
    wherein upon receiving the confirmation request sent from another node as to whether the node is providing the service, the controller of the node checks whether the service body has been invoked at the own node, and if the service body has not been invoked, the controller searches for a node in which the service record data file is stored using the service record data file key, obtains the service record data file from the node found by the searching, and invokes the service body to start providing the service.

9. A service providing method used in an overlay network system in which at least one node is mapped in a hash space by distributed hash table techniques, each of the at least one node having a node identifier obtained by hashing identification information of the own node, and in which at least one service concerning all the nodes constituting the overlay network system is provided, the service having a service key existing in the hash space, the service key being obtained by hashing a service name representing a name of the service, the service providing method comprising the steps of:
    causing the node to store a service name representing a name of the service and a service body representing a body of the service;
    automatically assigning the service to the node having the node identifier which is closest in the hash space to the service key of the service by causing the node to search for a current service provider node using the service key existing in the hash space, to check whether the own node is allowed to take over the service if a distance between the node identifier of the own node and the service key in the hash space is less than a distance between the node identifier of the current service provider node and the service key in the hash space, and to act as the service provider of the service by executing the service body in the own node if the takeover is permitted; and stopping the service in the own node upon receiving a notification of completion of service takeover from another node, when the another node is permitted to take over the service from the own node.

10. The service providing method according to claim 9,
wherein the node stores a service record data file and a service record data file name, the service record data file being data used for execution of the service, and the service record data file name being a name of the service record data file, and wherein when the own node starts providing the service, the node searches for a node mapped to a service record data file key using the service record data file key, the service record data file key being obtained by hashing the service record data file name, and transfers a copy of the service record data file to the node found by the searching.

11. The service providing method according to claim 9,
wherein the node stores a service profile and a service profile name, the service profile describing a method of access to the service body, and the service profile name being a name of the service profile, and wherein the node provides the service profile when the node starts the service.

12. The service providing method according to claim 11,
wherein when the node uses the service, the node searches for a node mapped to the service key using the service key, and obtains the service profile from the node found by the searching and accesses the service body.

13. The service providing method according to claim 9,
wherein when the own node is providing the service and the own node leaves the overlay network, the node searches for a node for which a distance between the node identifier and the service key in the hash space is second smallest next to the own node among nodes neighboring the own node, and sends a service handover request to the node found by the searching.

14. The service providing method according to claim 13,
wherein upon receiving the service handover request sent from another node, the node searches for a node in which the service record data file is stored using the service record data file key, obtains the service record data file from the node found by the searching, and invokes the service body to start providing the service.

15. The service providing method according to claim 10,
wherein, upon detecting a problem at a neighboring node, the node searches for nodes mapped to service keys using all the service keys obtained by hashing the service names of all the services, and sends a confirmation request to the nodes found by the searching as to whether the nodes are providing the services.

16. The service providing method according to claim 15,
wherein upon receiving the confirmation request sent from another node as to whether the node is providing the service, the node checks whether the service body has been invoked at the own node, and if the service body has not been invoked, the node searches for a node in which the service record data file is stored using the service record data file key, obtains the service record data file from the node found by the searching, and invokes the service body to start providing the service.

* * * * *